United States Patent
Shin et al.

(10) Patent No.: US 7,663,617 B2
(45) Date of Patent: *Feb. 16, 2010

(54) THIN FILM TRANSISTOR ARRAY PANEL AND LIQUID CRYSTAL DISPLAY INCLUDING THE PANEL

(75) Inventors: Kyoung-Ju Shin, Gyeonggi-do (KR); Chong-Chul Chai, Seoul (KR); Cheol-Woo Park, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 686 days.

This patent is subject to a terminal disclaimer.

(21) Appl. No.: 11/329,995

(22) Filed: Jan. 10, 2006

(65) Prior Publication Data
US 2006/0158575 A1 Jul. 20, 2006

(30) Foreign Application Priority Data
Jan. 17, 2005 (KR) .............. 10-2005-0004271

(51) Int. Cl.
*G09G 5/00* (2006.01)
(52) U.S. Cl. .................................. 345/204
(58) Field of Classification Search ........... 345/55, 345/76, 87, 92, 94, 98, 100, 102, 103, 107, 345/204, 89; 349/38–44, 55, 85, 111, 129, 349/140, 141, 144, 130; 257/72, 88
See application file for complete search history.

(56) References Cited

U.S. PATENT DOCUMENTS

| | | | | |
|---|---|---|---|---|
| 5,132,819 | A | * | 7/1992 | Noriyama et al. ......... 349/55 |
| 5,576,858 | A | * | 11/1996 | Ukai et al. ............... 349/42 |
| 5,610,739 | A | * | 3/1997 | Uno et al. ............... 349/39 |
| 5,680,190 | A | * | 10/1997 | Michibayashi et al. .... 349/140 |
| 6,226,058 | B1 | * | 5/2001 | Ohi ........................ 349/38 |
| 6,407,791 | B1 | | 6/2002 | Suzuki et al. |

(Continued)

FOREIGN PATENT DOCUMENTS

JP 2001-142097 5/2001

(Continued)

OTHER PUBLICATIONS

Patent Abstracts of Japan, Publication No. 2001-142097, May 25, 2001, 2 pp.

(Continued)

*Primary Examiner*—Prabodh M Dharia
(74) *Attorney, Agent, or Firm*—Innovation Counsel LLP

(57) ABSTRACT

A thin film transistor array panel according to an embodiment of the present invention includes: a substrate; a gate line disposed on the substrate and extending in a first direction; a capacitive electrode separated from the gate line and elongated in a second direction, a data line intersecting the gate line; a thin film transistor connected to the gate line and the data line and including a drain electrode; a coupling electrode overlapping the capacitive electrode and connected to the drain electrode; and a pixel electrode including at least one first subpixel electrode connected to the drain electrode and a second subpixel electrode connected to the capacitive electrode and spaced apart from the at least first subpixel electrode by a gap that overlaps the capacitive electrode or the coupling electrode.

21 Claims, 10 Drawing Sheets

U.S. PATENT DOCUMENTS

| | | | |
|---|---|---|---|
| 6,414,730 B1* | 7/2002 | Akamatsu et al. | 349/43 |
| 6,710,372 B2* | 3/2004 | Kim | 257/72 |
| 6,738,031 B2* | 5/2004 | Young et al. | 345/55 |
| 6,833,897 B2* | 12/2004 | Lee et al. | 349/141 |
| 6,933,533 B2* | 8/2005 | Yamazaki et al. | 257/88 |
| 6,958,791 B2* | 10/2005 | Shimoshikiryo | 349/85 |
| 7,206,048 B2* | 4/2007 | Song | 349/129 |
| 7,379,143 B2* | 5/2008 | Lyu | 349/130 |
| 2001/0035919 A1* | 11/2001 | Zhang | 349/44 |
| 2001/0055008 A1* | 12/2001 | Young et al. | 345/204 |
| 2002/0109813 A1* | 8/2002 | Yu et al. | 349/141 |
| 2003/0090599 A1* | 5/2003 | Ochiai et al. | 349/39 |
| 2003/0201964 A1* | 10/2003 | Murade | 345/100 |
| 2004/0001167 A1 | 1/2004 | Takeuchi et al. | |
| 2004/0070713 A1* | 4/2004 | Song | 349/129 |
| 2004/0160560 A1* | 8/2004 | Kim et al. | 349/129 |
| 2004/0212578 A1* | 10/2004 | Itou et al. | 345/100 |
| 2004/0252088 A1* | 12/2004 | Kawachi et al. | 345/76 |
| 2005/0078263 A1* | 4/2005 | Kim et al. | 349/144 |
| 2005/0110924 A1* | 5/2005 | Kim et al. | 349/111 |
| 2005/0179631 A1* | 8/2005 | Lyu | 345/87 |
| 2005/0219188 A1* | 10/2005 | Kawabe et al. | 345/94 |
| 2005/0253797 A1* | 11/2005 | Kamada et al. | 345/89 |
| 2006/0087598 A1* | 4/2006 | Lee et al. | 349/41 |
| 2006/0092367 A1* | 5/2006 | Shin et al. | 349/144 |
| 2006/0119758 A1* | 6/2006 | Chai et al. | 349/43 |

FOREIGN PATENT DOCUMENTS

| | | |
|---|---|---|
| JP | 2003-186017 | 7/2003 |
| JP | 2004-165241 | 6/2004 |
| JP | 2004-212963 | 7/2004 |
| JP | 2004-527011 | 9/2004 |
| KR | 1999-0030848 | 5/1999 |
| KR | 2004-0001687 | 1/2004 |
| KR | 2004-0053642 | 6/2004 |
| KR | 2004-0062252 | 7/2004 |
| KR | 2004-0062751 | 7/2004 |
| KR | 2004-0062752 | 7/2004 |
| KR | 2004-0084019 | 10/2004 |

OTHER PUBLICATIONS

Patent Abstracts of Japan, Publication No. 2003-186017, Jul. 3, 2003, 2 pp.

Patent Abstracts of Japan, Publication No. 2004-165241, Jun. 10, 2004, 1 p.

Patent Abstracts of Japan, Publication No. 2004-212963, Jul. 29, 2004, 1 p.

English Language Abstract, Publication No. JP2004527011, Sep. 2, 2004, 1 p.

Korean Patent Abstracts, Publication No. 1019990030848, May 6, 1999, 1 p.

Korean Patent Abstracts, Publication No. 1020040001687, Jan. 7, 2004, 2 pp.

Korean Patent Abstracts, Publication No. 1020040053642, Jun. 24, 2004, 1 p.

Korean Patent Abstracts, Publication No. 1020040062751, Jul. 9, 2004, 1 p.

Korean Patent Abstracts, Publication No. 1020040062752, Jul. 9, 2004, 1 p.

Korean Patent Abstracts, Publication No. 1020040084019, Oct. 6, 2004, 1 p.

* cited by examiner

THIN FILM TRANSISTOR ARRAY PANEL AND LIQUID CRYSTAL DISPLAY INCLUDING THE PANEL

CROSS-REFERENCE TO RELATED APPLICATIONS

This application claims the benefit of Korean Patent Application No. 10-2005-0004271, filed on Jan. 17, 2005 in the Korean Intellectual Property Office, the disclosure of which is incorporated herein by reference.

BACKGROUND OF THE INVENTION (a) Field of the Invention

The present invention relates to a thin film transistor array panel and a liquid crystal display including the panel.

(b) Description of the Related Art

A liquid crystal display (LCD) is one of the most widely used flat panel displays. An LCD includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

Among the LCDs, a vertical alignment (VA) mode LCD, which aligns LC molecules such that the long axes of the LC molecules are perpendicular to the panels in the absence of electric field, is popular because of its high contrast ratio and wide reference viewing angle.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed into several directions by using the cutouts and the protrusions such that the reference viewing angle is widened.

However, the VA mode LCD has poor lateral visibility as compared with front visibility.

In addition, it is required to realize a pixel structure that has a maximum aperture ratio and a good resistance against pixel defects that can be generated during the manufacturing process.

SUMMARY OF THE INVENTION

A thin film transistor array panel according to an embodiment of the present invention includes: a substrate; a gate line disposed on the substrate and extending in a first direction; a capacitive electrode separated from the gate line and elongated in a second direction; a data line intersecting the gate line; a thin film transistor connected to the gate line and the data line and including a drain electrode; a coupling electrode overlapping the capacitive electrode and connected to the drain electrode; and a pixel electrode including at least one first subpixel electrode connected to the drain electrode and a second subpixel electrode connected to the capacitive electrode and spaced apart from the at least first subpixel electrode by a gap that overlaps the capacitive electrode or the coupling electrode.

The thin film transistor array panel may further include a storage electrode line overlapping the pixel electrode and including a storage electrode.

The drain electrode may include an extension overlapping the gap and the storage electrode.

The storage electrode and the capacitive electrode may extend in a line.

The storage electrode, the capacitive electrode, the coupling electrode, and the extension of the drain electrode may be elongated parallel to the data line and disposed substantially symmetrical to a reference line parallel to the gate line.

The drain electrode may further include an interconnection connecting the extension and the coupling electrode and disposed at a position far from the data line.

The storage electrode line may overlap the gap.

The thin film transistor array panel may further include a passivation layer disposed between the pixel electrode and the capacitive electrode and the coupling electrode.

The coupling electrode may have a through-hole and the passivation layer may have a contact hole connecting the second subpixel electrode and the capacitive electrode and disposed within the through-hole of the coupling electrode.

The third subpixel electrode is spaced apart from the second subpixel electrode by a second gap that overlaps the storage electrode.

The first subpixel electrode is connected to the drain electrode via the coupling electrode.

The thin film transistor array panel may further include a shielding electrode separated from the pixel electrode and overlapping the data line or the gate line at least in part. The pixel electrode and the shielding electrode may include the same layer. The shielding electrode may extend along the data line or the gate lines and it may fully cover the data line.

The pixel electrode may include a partitioning member for partitioning the pixel electrode into a plurality of partitions. The partitioning member may include a portion extending parallel to the gap.

The gap may make an angle of about 45 degrees with the gate line.

A liquid crystal display according to an embodiment of the present invention includes: a gate line; a data line intersecting the gate line; a capacitive electrode separated from the gate line and elongated substantially parallel to the data line; a thin film transistor connected to the gate line and the data line and including a drain electrode; a coupling electrode overlapping the capacitive electrode and connected to the drain electrode; a pixel electrode including a first subpixel electrode connected to the drain electrode and a second subpixel electrode connected to the capacitive electrode and spaced apart from the first subpixel electrode by a gap that overlaps the capacitive electrode or the coupling electrode; a common electrode disposed opposite the pixel electrode; and a liquid crystal layer interposed between the pixel electrode and the common electrode.

The liquid crystal layer may be subjected to a vertical alignment.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
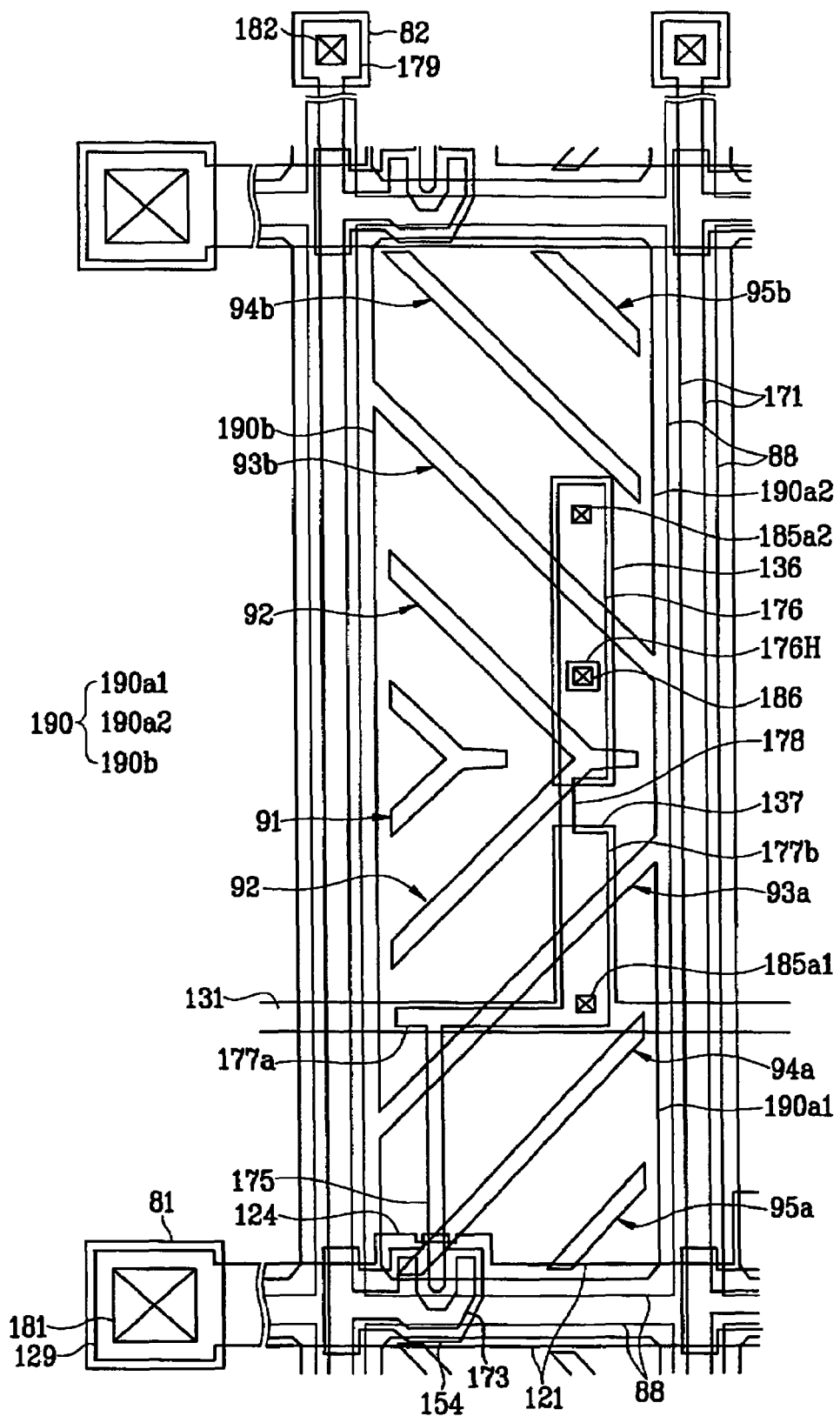
FIG. 1 is a layout view of a TFT array panel of an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

An LCD according to an embodiment of the present invention will be described in detail with reference to FIGS. 1-6.

Figure 2:
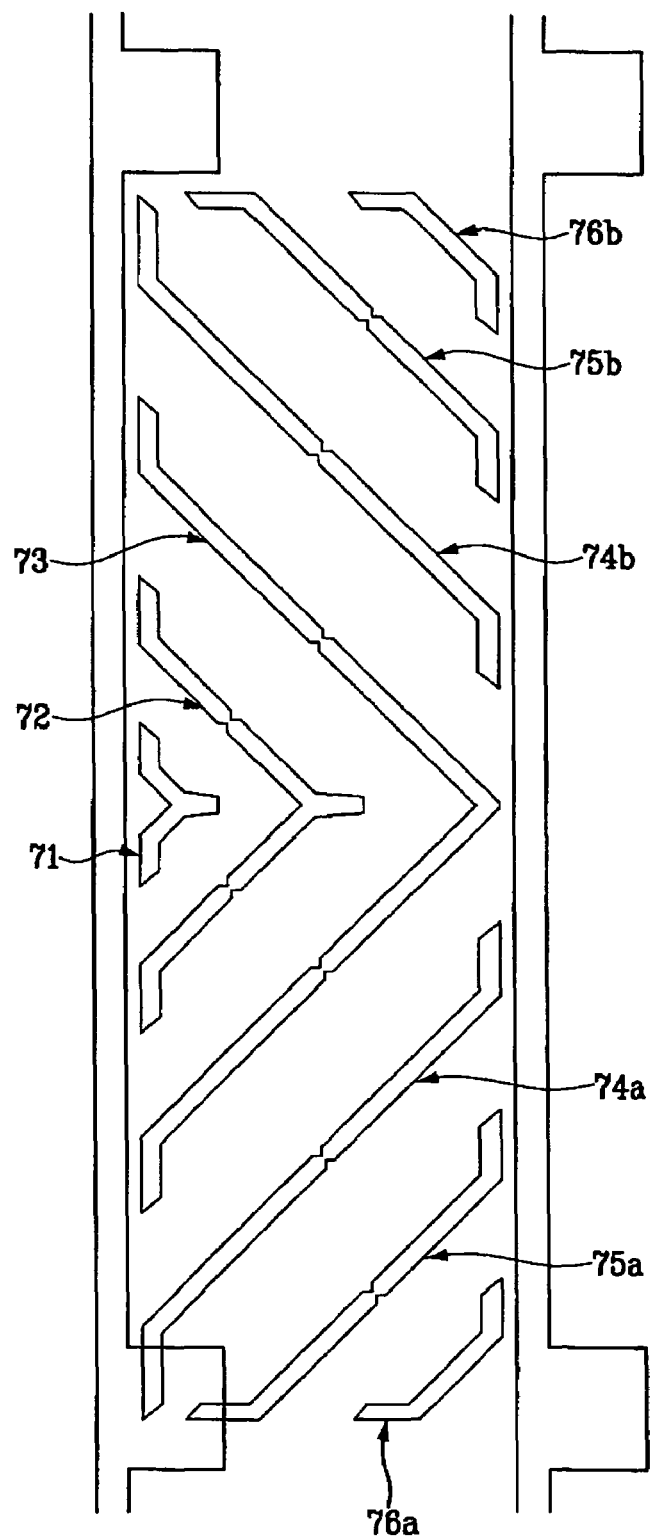
FIG. 2 is a layout view of a common electrode panel of an LCD according to an embodiment of the present invention.
Figure 3:
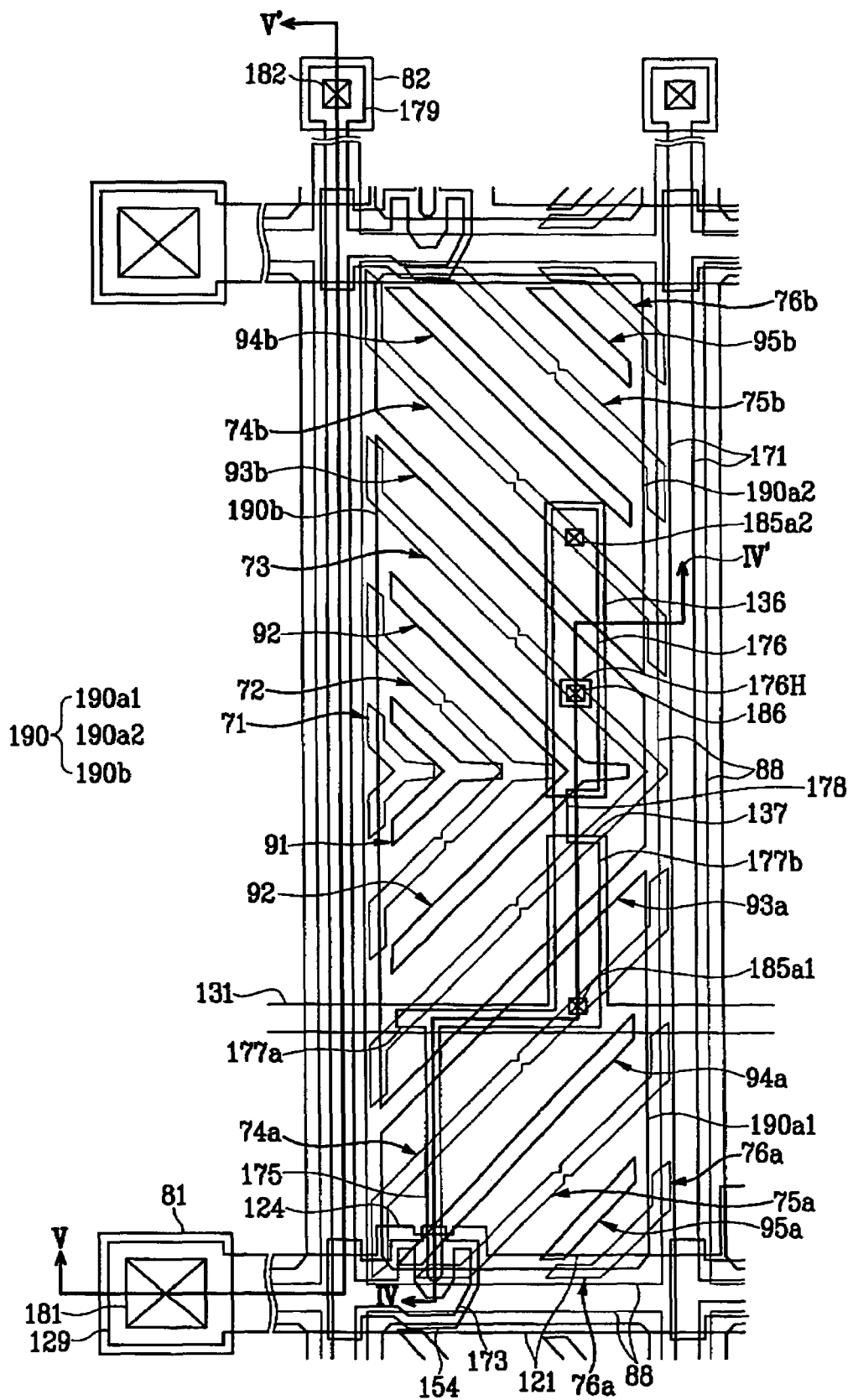
FIG. 3 is a layout view of an LCD including the TFT array panel shown in FIG. 1 and the common electrode panel shown in FIG. 2.
Figure 4:
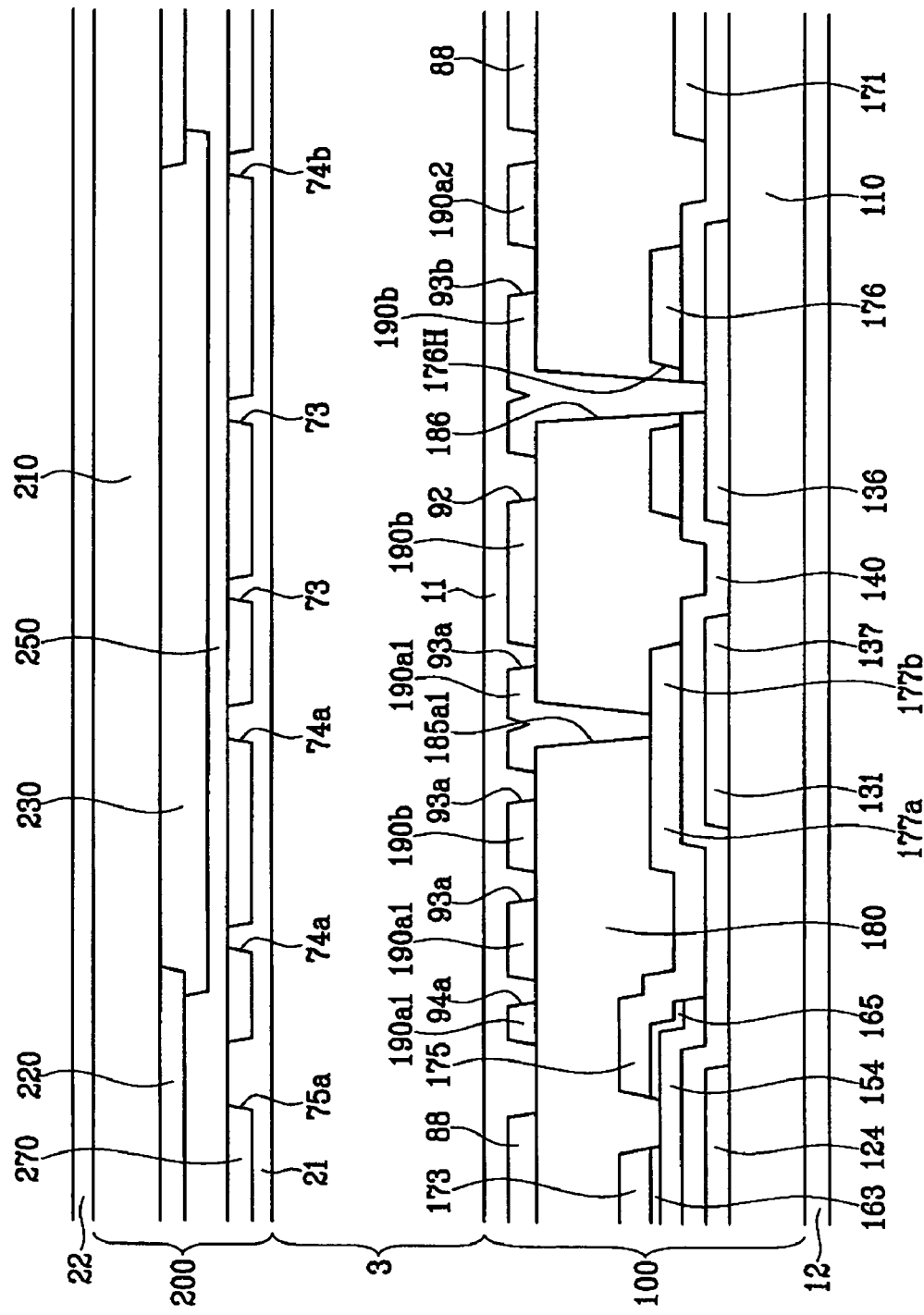
FIGS. 4 and 5 are sectional views of the LCD shown in FIG. 3 taken along lines IV-IV' and V-V', respectively.
Figure 5:
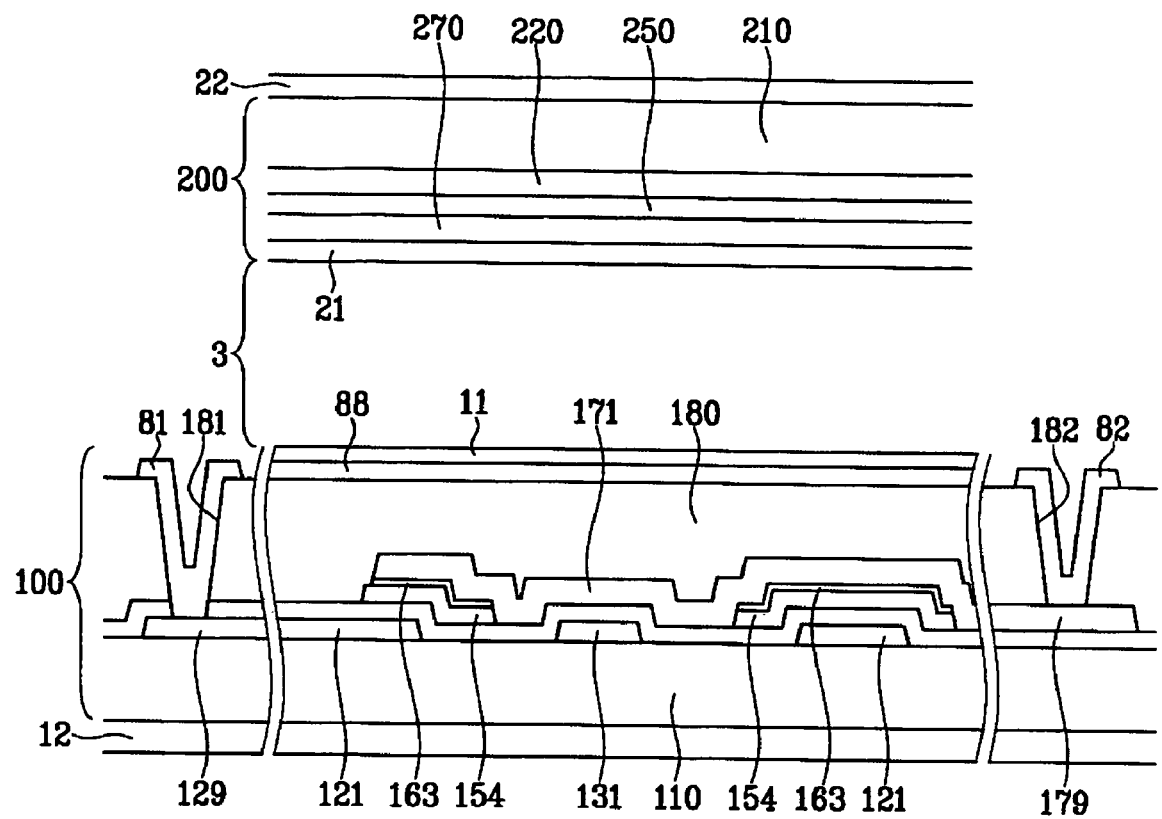
Figure 6:
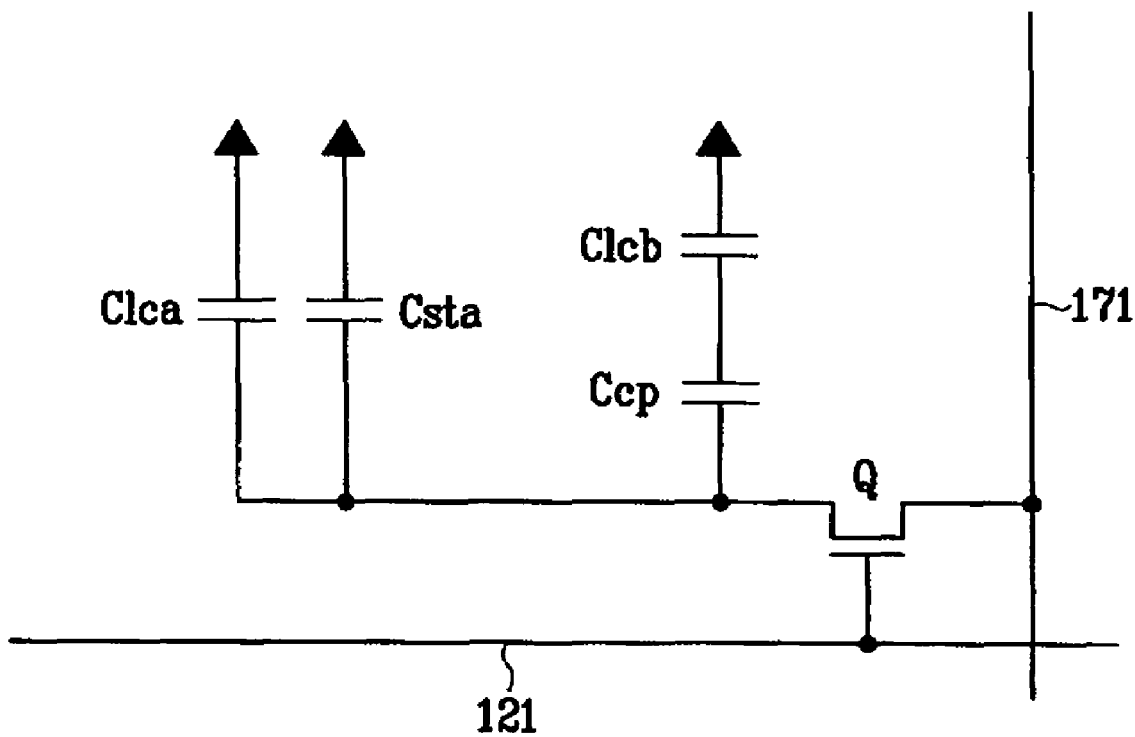
FIG. 6 is an equivalent circuit diagram of the LCD shown FIGS. 1-5.

FIG. 1 is a layout view of a TFT array panel of an LCD according to an embodiment of the present invention, FIG. 2 is a layout view of a common electrode panel of an LCD according to an embodiment of the present invention, FIG. 3 is a layout view of an LCD including the TFT array panel shown in FIG. 1 and the common electrode panel shown in FIG. 2, FIGS. 4 and 5 are sectional views of the LCD shown in FIG. 3 taken along lines IV-IV' and V-V', and FIG. 6 is an equivalent circuit diagram of the LCD shown in FIGS. 1-5.

Referring to FIGS. 1-5, an LCD according to an embodiment of the present invention includes a TFT array panel 100, a common electrode panel 200, and a LC layer 3 interposed between the panels 100 and 200.

The TFT array panel 100 is now described in detail with reference FIGS. 1 and 3-5.

A plurality of gate conductors including a plurality of gate lines 121, a plurality of storage electrode lines 131, and a plurality of capacitive electrodes 136 are formed on an insulating substrate 110 such as transparent glass or plastic.

The gate lines 121 transmit gate signals and extend substantially in a transverse direction. Each gate line 121 includes a plurality of gate electrodes 124 projecting upward and an end portion 129 having a large area for contact with another layer or an external driving circuit. A gate driving circuit (not shown) for generating the gate signals may be mounted on a flexible printed circuit (FPC) film (not shown), which may be attached to the substrate 110, directly mounted on the substrate 110, or integrated onto the substrate 110. The gate lines 121 may extend to be connected to a driving circuit that may be integrated on the substrate 110.

The storage electrode lines 131 are supplied with a predetermined voltage and extend substantially parallel to the gate lines 121. Each of the storage electrode lines 131 is disposed between two adjacent gate lines 121 and it is close to a lower one of the two adjacent gate lines 121 while maintaining a sufficient distance from the lower gate line 121. Each of the storage electrode lines 131 includes a plurality of storage electrodes 137 projecting upward.

Each of the capacitive electrodes 136, which are separated from the storage electrode lines 131, is elongated in a longitudinal direction in coincidence with the extension direction of a storage electrode 137.

A pair of a capacitive electrode 136 and a storage electrode 137 disposed between two adjacent gate lines 121 is disposed almost symmetrical to a reference line that is equidistant from the two gate lines 121 and parallel to the gate lines 121. In detail, a lower end of the capacitive electrode 136 is slightly spaced apart from an upper end of the storage electrode 137, and an upper end of the capacitive electrode 136 is spaced apart from an upper one of the two gate lines 121 by a distance almost equal to a distance between a lower end of the storage electrode 137 and a lower one of the two gate lines 121.

The gate conductors 121, 131 and 136 are preferably made of Al containing metal such as Al and Al alloy, Ag containing metal such as Ag and Ag alloy, Cu containing metal such as Cu and Cu alloy, Mo containing metal such as Mo and Mo alloy, Cr, Ta, or Ti. However, they may have a multi-layered structure including two conductive films (not shown) having different physical characteristics. One of the two films is preferably made of low resistivity metal including Al containing metal, Ag containing metal, and Cu containing metal for reducing signal delay or voltage drop. The other film is preferably made of material such as Mo containing metal, Cr, Ta, or Ti, which has good physical, chemical, and electrical contact characteristics with other materials such as indium tin oxide (ITO) or indium zinc oxide (IZO). Good examples of the combination of the two films are a lower Cr film and an upper Al (alloy) film and a lower Al (alloy) film and an upper Mo (alloy) film. However, the gate conductors 121, 131 and 136 may be made of various metals or conductors.

The lateral sides of the gate conductors 121, 131 and 136 are inclined relative to a surface of the substrate 110, and the inclination angle thereof ranges about 30-80 degrees.

A gate insulating layer 140 preferably made of silicon nitride (SiNx) or silicon oxide (SiOx) is formed on the gate conductors 121, 131 and 136.

A plurality of semiconductor islands 154 preferably made of hydrogenated amorphous silicon (abbreviated to "a-Si") or polysilicon are formed on the gate insulating layer 140. The semiconductor islands 154 are disposed on the gate electrodes 124 and include extensions covering edges of the gate lines 121. A plurality of other semiconductor islands (not shown) may be disposed on the storage electrode lines 131.

A plurality of ohmic contact islands 163 and 165 are formed on the semiconductor stripes 154. The ohmic contacts 163 and 165 are preferably made of n+ hydrogenated a-Si heavily doped with n type impurity such as phosphorous or they may be made of silicide. The ohmic contacts 163 and 165 are located in pairs on the semiconductor islands 154.

The lateral sides of the semiconductor islands 154 and the ohmic contacts 163 and 165 are inclined relative to the surface of the substrate 110, and the inclination angles thereof are preferably in a range of about 30-80 degrees.

A plurality of data conductors including a plurality of data lines 171 and a plurality of drain electrodes 175 are formed on the ohmic contacts 163 and 165 and the gate insulating layer 140.

The data lines 171 transmit data signals and extend substantially in the longitudinal direction to intersect the gate lines 121 and the storage electrode lines 131. Each data line 171 includes a plurality of source electrodes 173 projecting toward the gate electrodes 124 and an end portion 179 having a large area for contact with another layer or an external driving circuit. A data driving circuit (not shown) for generating the data signals may be mounted on a FPC film (not shown), which may be attached to the substrate 110, directly mounted on the substrate 110, or integrated onto the substrate 110. The data lines 171 may extend to be connected to a driving circuit that may be integrated on the substrate 110.

Each of the drain electrodes 175 is separated from the data lines 171 and includes a narrow end portion disposed opposite the source electrodes 173 with respect to the gate electrodes 124. The end portion is partly enclosed by a source electrode 173 that is curved like a character U.

Each drain electrode 175 further includes a transverse extension 177a, a pair of lower and upper longitudinal extensions 177b and 176, and an interconnection 178. Each of the extensions 177b and 176 is a rectangle elongated parallel to the data lines 171 and spaced apart from the data lines 171 by a sufficient distance, and the interconnection 178 connects the lower extension 177b and the upper extension 176.

The transverse extension 177a overlaps a storage electrode line 131. The lower longitudinal extension 177b overlaps a storage electrode 137 of the storage electrode line 131 and it has nearly the same shape as the storage electrode 137. The upper extension 176 overlaps a capacitive electrode 136 and it is referred to as a "coupling electrode." The coupling electrode 176 has a through-hole 176H exposing a top surface of the gate insulating layer 140 and it has nearly the same shape as the capacitive electrode 136. The interconnection 178 connects the coupling electrode 176 and the lower longitudinal extension 177b at left sides thereof.

A gate electrode 124, a source electrode 173, and a drain electrode 175 along with a semiconductor island 154 form a TFT having a channel formed in the semiconductor island 154 disposed between the source electrode 173 and the drain electrode 175.

The data conductors 171 and 175 are preferably made of refractory metal such as Cr, Mo, Ta, Ti, or alloys thereof. However, they may have a multilayered structure including a refractory metal film (not shown) and a low resistivity film (not shown). Good examples of the multi-layered structure are a double-layered structure including a lower Cr/Mo (alloy) film and an upper Al (alloy) film and a triple-layered structure of a lower Mo (alloy) film, an intermediate Al (alloy) film, and an upper Mo (alloy) film. However, the data conductors 171 and 175 may be made of various metals or conductors.

The data conductors 171 and 175 have inclined edge profiles, and the inclination angles thereof range about 30-80 degrees.

The ohmic contacts 163 and 165 are interposed only between the underlying semiconductor islands 154 and the overlying data conductors 171 and 175 thereon and reduce the contact resistance therebetween. The extensions of the semiconductor islands 154 disposed on the edges of the gate lines 121 smooth the profile of the surface to prevent disconnection of the data lines 171 there. The semiconductor islands 154 include some exposed portions, which are not covered with the data conductors 171 and 175, such as portions located between the source electrodes 173 and the drain electrodes 175.

A passivation layer 180 is formed on the data conductors 171 and 175, and the exposed portions of the semiconductor islands 154. The passivation layer 180 is preferably made of inorganic or organic insulator and it may have a flat surface. Examples of the inorganic insulator include silicon nitride and silicon oxide. The organic insulator may have photosensitivity and it preferably has dielectric constant less than about 4.0. The passivation layer 180 may include a lower film of inorganic insulator and an upper film of organic insulator such that it takes the excellent insulating characteristics of the organic insulator while preventing the exposed portions of the semiconductor islands 154 from being damaged by the organic insulator.

The passivation layer 180 has a plurality of contact holes 182 exposing the end portions 179 of the data lines 171, a plurality of contact holes 185a1 exposing the lower ends of the lower extensions 177b of the drain electrodes 175, and a plurality of contact holes 185a2 exposing the upper ends of the coupling electrodes 176. The passivation layer 180 and the gate insulating layer 140 have a plurality of contact holes 181 exposing the end portions 129 of the gate lines 121 and a plurality of contact holes 186 penetrating the through-holes 176H without exposing the coupling electrode 176 and exposing portions of the capacitive electrodes 136. The contact holes 181, 182, 185a1, 185a2 and 186 may have inclined or stepped sidewalls that can be easily obtained by using organic material.

A plurality of pixel electrodes 190, a shielding electrode 88, and a plurality of contact assistants 81 and 82 are formed on the passivation layer 180. They are preferably made of transparent conductor such as ITO or IZO or reflective conductor such as Ag, Al, Cr, or alloys thereof.

Each pixel electrode 190 is approximately a rectangle having chamfered corners and the chamfered edges of the pixel electrode 190 make an angle of about 45 degrees with the gate lines 121. The pixel electrodes 190 overlap the gate lines 121 to increase the aperture ratio.

Each of the pixel electrodes 190 has lower and upper gaps 93a and 93b that divide the pixel electrode 190 into lower, upper, and central sub-pixel electrodes 190a1, 190a2 and 190b. The lower and the upper gaps 93a and 93b obliquely extend from a left edge to a right edge of the pixel electrode 190 such that the central sub-pixel electrode 190b is an isosceles trapezoid rotated by a right angle and the lower and the upper sub-pixel electrodes 190a1 and 190a2 are right-angled trapezoids rotated by a right angle. The lower and the upper gaps 93a and 93b make an angle of about 45 degrees with the gate lines 121 and they are perpendicular to each other.

The lower and the upper sub-pixel electrodes 190a1 and 190a2 are connected to the lower and the upper extensions 177b and 176 of the drain electrodes 175 through contact holes 185a1 and 185a2, respectively.

The central sub-pixel electrode 190b is connected to a capacitive electrode 136 through a contact hole 186 and overlaps a coupling electrode 176. The central sub-pixel electrode 190b, the capacitive electrode 136, and the coupling electrode 176 form a "coupling capacitor."

The central sub-pixel electrode 190b has central cutouts 91 and 92, the lower sub-pixel electrode 190a1 has lower cutouts 94a and 95a, and the upper sub-pixel electrode 190a2 has upper cutouts 94b and 95b. The cutouts 91, 92 and 94a-95b partition the sub-pixel electrodes 190b, 190a1 and 190a2 into a plurality of partitions. The pixel electrode 190 having the cutouts 91, 92 and 94a-95b and the gaps 93a and 93b (also referred to as cutouts hereinafter) substantially has an inversion symmetry with respect to an imaginary line bisecting the pixel electrode 190 and parallel to the pixel electrode.

Each of the lower and the upper cutouts 94a-95b obliquely extends approximately from a left corner, a lower edge, or an upper edge of the pixel electrode 190 approximately to a right edge of the pixel electrode 190. The lower and the upper cutouts 94a-95b make an angle of about 45 degrees to the gate lines 121, and they extend substantially perpendicular to each other.

Each of the center cutouts 91 and 92 includes a transverse portion and a pair of oblique portions connected thereto. The transverse portion shortly extends along the capacitive electrode 136, and the oblique portions obliquely extend from the transverse portion toward the left edge of the pixel electrode 190 in parallel to the lower and the upper cutouts 94a-95b, respectively.

The number of the cutouts or the number of the partitions is varied depending on the design factors such as the size of the pixel electrode 190, the ratio of the transverse edges and the longitudinal edges of the pixel electrode 190, the type and characteristics of the liquid crystal layer 3, and so on.

The shielding electrode 88 is supplied with the common voltage and it includes longitudinal portions extending along the data lines 171 and transverse portions extending along the gate lines 127 to connect adjacent longitudinal portions. The longitudinal portions fully cover the data lines 171, while each of the transverse portions lies within the boundary of a gate line 121.

The shielding electrode 88 blocks electromagnetic interference between the data lines 171 and the pixel electrodes 190 and between the data lines 171 and the common electrode 270 to reduce the distortion of the voltage of the pixel electrodes 190 and the signal delay of the data voltages carried by the data lines 171.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices.

The description of the common electrode panel 200 follows with reference to FIGS. 2-5.

A light blocking member 220 referred to as a black matrix for preventing light leakage is formed on an insulating substrate 210 such as transparent glass or plastic. The light blocking member 220 include a plurality of rectilinear portion facing the data lines 171 on the TFT array panel 100 and a plurality of widened portions facing the TFTs on the TFT array panel 100. Otherwise, the light blocking member 220 may have a plurality of openings that face the pixel electrodes 190 and it may have substantially the same planar shape as the pixel electrodes 190.

A plurality of color filters 230 are also formed on the substrate 210 and they are disposed substantially in the areas enclosed by the light blocking member 220. The color filters 230 may extend substantially along the longitudinal direction along the pixel electrodes 190. The color filters 230 may represent one of the primary colors such as red, green and blue colors.

An overcoat 250 is formed on the color filters 230 and the light blocking member 220. The overcoat 250 is preferably made of (organic) insulator and it prevents the color filters 230 from being exposed and provides a flat surface.

A common electrode 270 is formed on the overcoat 250. The common electrode 270 is preferably made of transparent conductive material such as ITO and IZO and has a plurality of sets of cutouts 71, 72, 73, 74a, 74b, 75a, 75b, 76a and 76b.

A set of cutouts 71-76b face a pixel electrode 190 and include center cutouts 71, 72 and 73, lower cutout 74a, 75a and 76a and upper cutouts 74b, 75b and 76b. The cutout 71 is disposed near the contact hole 186 and each of the cutouts 72-76b is disposed between adjacent cutouts 91-95b of the pixel electrode 190 or between a cutout 95a or 95b and a chamfered edge of the pixel electrode 190. Each of the cutouts 71-76b has at least an oblique portion extending parallel to the lower cutout 93a-95a or the upper cutout 93b-95b of the pixel electrode 190. Each of the oblique portions of the cutouts 72-75b has a depressed notch and the cutouts 71-76b have substantially an inversion symmetry with respect to the above-described imaginary transverse line of bisecting the pixel electrode 190.

Each of the lower and the upper cutouts 74a-76b includes an oblique portion and a pair of transverse and longitudinal portions or a pair of longitudinal portions. The oblique portion extends approximately from a left edge, a lower edge, or an upper edge of the pixel electrode 190 approximately to a right edge of the pixel electrode 190. The transverse and longitudinal portions extend from respective ends of the oblique portion along edges of the pixel electrode 190, overlapping the edges of the pixel electrode 190, and making obtuse angles with the oblique portion.

Each of the center cutouts 71 and 72 includes a central transverse portion, a pair of oblique portions, and a pair of terminal longitudinal portions and the center cutout 73 includes a pair of oblique portions and a pair of terminal longitudinal portions. The central transverse portion is disposed near the left edge or a center of the pixel electrode 190 and extends along the capacitive electrode 136. The oblique portions extend from an end of the central transverse portion or approximately from a center of the right edge of the pixel electrode 190, approximately to the left edge of the pixel electrode. The oblique portions of the cutouts 71 and 72 make oblique angles with the central transverse portion. The terminal longitudinal portions extend from the ends of the respective oblique portions along the left edge of the pixel electrode 190, overlapping the left edge of the pixel electrode 190, and making obtuse angles with the respective oblique portions.

The number of the cutouts 71-76b may be also varied depending on the design factors, and the light blocking member 220 may overlap the cutouts 71-76b to block the light leakage through the cutouts 71-76b.

Alignment layers 11 and 21 that may be homeotropic are coated on inner surfaces of the panels 100 and 200, and polarizers 12 and 22 are provided on outer surfaces of the panels 100 and 200 so that their polarization axes may be crossed and one of the polarization axes may be parallel to the gate lines 121. One of the polarizers 12 and 22 may be omitted when the LCD is a reflective LCD.

The LCD may further include at least one retardation film (not shown) for compensating the retardation of the LC layer 3. The retardation film has birefringence and gives a retardation opposite to that given by the LC layer 3.

The LCD may further include a backlight unit (not shown) supplying light to the LC layer 3 through the polarizers 12 and 22, the retardation film, and the panels 100 and 200.

It is preferable that the LC layer 3 has negative dielectric anisotropy and it is subjected to a vertical alignment that the LC molecules in the LC layer 3 are aligned such that their long axes are substantially vertical to the surfaces of the panels 100 and 200 in the absence of electric field. Accordingly, incident light cannot pass the crossed polarization system 12 and 22.

The opaque members such as the storage electrode lines 131, the capacitive electrodes 136, and the extensions 177a, 177b and 176 of the drain electrodes 175, and the transparent members such as the pixel electrodes 190 having the cutouts 91-95b and 71-76b are almost symmetrically arranged with respect to a reference line that are equidistant from adjacent gate lines 121. At least one of the opaque members elongated in the longitudinal direction, i.e., the storage electrodes 137, the capacitive electrodes 136, and the longitudinal extensions 176 and 177b of the drain electrodes 175 intersects the gaps 93a and 93b between the subpixel electrodes 190a1, 190a2 and 190b.

In this configuration, since the longitudinal extensions 176 and 177b and the interconnections 178 of the drain electrodes 175 are spaced apart from the data lines 171, short circuit between the data lines 171 and the drain electrodes 175 can be reduced. Similarly, the storage electrode lines 131 are spaced apart from the gate lines 121 by a sufficient distance, short circuit between the gate lines 121 and the storage electrode lines 131 can be reduced.

Furthermore, since the data lines 171 and the drain electrodes 175 intersect the storage electrode lines 131 and the capacitive electrodes 136 by a minimized amount while maintaining up-down symmetry, disconnection of the data lines 171 and the drain electrodes 175 can be reduced.

In addition, since capacitor members such as the storage electrodes 137, the capacitive electrodes 136, and the longitudinal extensions 176 and 177b of the drain electrodes 175 are elongated and aligned in the longitudinal direction, and the contacts between the lower and the upper subpixel electrodes 190a1 and 190a2 and the drain electrodes 175 are made on the longitudinal extensions 176 and 177b, the aperture ratio can be increased.

The LCD shown in FIGS. 1-5 is represented as an equivalent circuit shown in FIG. 6.

Referring to FIG. 6, a pixel of the LCD includes a TFT Q, a first subpixel including a first LC capacitor $C_{LC}a$ and a storage capacitor $C_{ST}a$, a second subpixel including a second LC capacitor $C_{LC}b$, and a coupling capacitor Ccp.

The first LC capacitor $C_{LC}a$ includes lower and upper sub-pixel electrodes 190a1 and 190a2 as one terminal, a portion of the common electrode 270 corresponding thereto as the other terminal, and a portion of the LC layer 3 disposed therebetween as a dielectric. Similarly, the second LC capacitor $C_{LC}b$ includes a central sub-pixel electrode 190b as one terminal, a portion of the common electrode 270 corresponding thereto as the other terminal, and a portion of the LC layer 3 disposed thereon as a dielectric.

The storage capacitor $C_{ST}a$ includes transverse and lower longitudinal extensions 177a and 177b of a drain electrode 175 as one terminal, portions of a storage electrode line 131 overlapping the extensions 177a and 177b as the other terminal, and a portion of the gate insulating layer 140 disposed therebetween as a dielectric.

The coupling capacitor Ccp includes a central sub-pixel electrode 190b and a capacitive electrode 136 as one terminal, a coupling electrode 176 as the other terminal, and portions of the passivation layer 180 and the gate insulating layer 140 disposed therebetween as a dielectric.

The first LC capacitor $C_{LC}a$ and the storage capacitor $C_{ST}$ are connected in parallel to a drain of the TFT Q. The coupling capacitor Ccp is connected between the drain of the TFT Q and the second LC capacitor $C_{LC}b$. The common electrode 270 is supplied with a common voltage Vcom and the storage electrode lines 131 may be supplied with the common voltage Vcom.

The TFT Q applies data voltages from a data line 171 to the first LC capacitor $C_{LC}a$ and the coupling capacitor Ccp in response to a gate signal from a gate line 121, and the coupling capacitor Ccp transmits the data voltage with a modified magnitude to the second LC capacitor $C_{LC}b$.

If the storage electrode line 131 is supplied with the common voltage Vcom and each of the capacitors $C_{LC}a$, $C_{ST}$, $C_{LC}b$ and Ccp and the capacitance thereof are denoted as the same reference characters, the voltage Vb charged across the second LC capacitor $C_{LC}b$ is given by:

$$Vb = Va \times [Ccp/(Ccp + C_{LC}b)],$$

where Va denotes the voltage of the first LC capacitor $C_{LC}a$.

Since the term $Ccp/(Ccp+C_{LC}b)$ is smaller than one, the voltage Vb of the second LC capacitor $C_{LC}b$ is greater than that of the first LC capacitor $C_{LC}a$. This inequality may be also true for a case that the voltage of the storage electrode line 131 is not equal to the common voltage Vcom.

When the potential difference is generated across the first LC capacitor $C_{LC}a$ or the second LC capacitor $C_{LC}b$, an electric field substantially perpendicular to the surfaces of the panels 100 and 200 is generated in the LC layer 3 and both the pixel electrode 190 and the common electrode 190 are commonly referred to as field generating electrodes hereinafter. Then, the LC molecules in the LC layer 3 tilt in response to the electric field such that their long axes are perpendicular to the field direction. The degree of the tilt of the LC molecules determines the variation of the polarization of light incident on the LC layer 3 and the variation of the light polarization is transformed into the variation of the light transmittance by the polarizers 12 and 22. In this way, the LCD displays images.

The tilt angle of the LC molecules depends on the strength of the electric field. Since the voltage Va of the first LC capacitor $C_{LC}a$ and the voltage Va of the second LC capacitor $C_{LC}b$ are different from each other, the tilt direction of the LC molecules in the first subpixel is different from that in the second subpixel and thus the luminances of the two subpixels are different. Accordingly, while maintaining the average luminance of the two subpixels in a target luminance, the voltages Va and Vb of the first and the second subpixels can be adjusted so that an image viewed from a lateral side is the closest to an image viewed from the front, thereby improving the lateral visibility.

The ratio of the voltages Va and Vb can be adjusted by varying the capacitance of the coupling capacitor Ccp, and the coupling capacitance Ccp can be varied by changing the overlapping area and distance between the coupling electrode 176 and the central sub-pixel electrode 190b (and the capacitive electrode 136). For example, the distance between the coupling electrode 176 and the central sub-pixel electrode 190b becomes large when the capacitive electrode 136 is removed and the coupling electrode 176 is moved to the position of the capacitive electrode 136. Preferably, the voltage Vb of the second LC capacitor $C_{LC}b$ is from about 0.6 to about 0.8 times the voltage Va of the first LC capacitor $C_{LC}a$.

The voltage Vb charged in the second LC capacitor $C_{LC}b$ may be larger than the voltage Va of the first LC capacitor $C_{LC}a$. This can be realized by precharging the second LC capacitor $C_{LC}b$ with a predetermined voltage such as the common voltage Vcom.

The ratio of the lower and the upper sub-pixel electrodes 190a1 and 190a2 of the first subpixel and the central sub-pixel electrode 190b of the second subpixel is preferably from about 1:0.85 to about 1:1.15 and the number of the sub-pixel electrodes in each of the LC capacitors $C_{LC}a$ and $C_{LC}b$ may be changed.

The tilt direction of the LC molecules is determined by a horizontal component generated by the cutouts 91-95b and 71-76b of the field generating electrodes 190 and 270 and the oblique edges of the pixel electrodes 190 distorting the electric field, which is substantially perpendicular to the edges of the cutouts 91-95b and 71-76b and the oblique edges of the pixel electrodes 190. Referring to FIG. 3, a set of the cutouts 91-95b and 71-76b divides a pixel electrode 190 into a plurality of sub-areas and each sub-area has two major edges. Since the LC molecules on each sub-area tilt perpendicular to the major edges, the azimuthal distribution of the tilt directions are localized to four directions, thereby increasing the reference viewing angle of the LCD.

In addition, when the areas that can transmit light for the above-described four tilt directions are the same, the visibility becomes better for various viewing directions. Since the opaque members are symmetrically arranged as described above, the adjustment of the transmissive areas is easy.

The notches in the cutouts 72-75b determine the tilt directions of the LC molecules on the cutouts 72-75b and they may be provided at the cutouts 91-95b and may have various shapes and arrangements.

The shapes and the arrangements of the cutouts 91-95b and 71-76b for determining the tilt directions of the LC molecules may be modified and at least one of the cutouts 91-95b and 71-76b can be substituted with protrusions (not shown) or depressions (not shown). The protrusions are preferably made of organic or inorganic material and disposed on or under the field-generating electrodes 190 or 270.

In the meantime, since there is no electric field between the shielding electrode 88 and the common electrode 270, the LC molecules on the shielding electrode 88 remain their initial orientations and thus the light incident thereon is blocked. Accordingly, the shielding electrode 88 may serve as a light blocking member.

An LCD according to another embodiment of the present invention will be described in detail with reference to FIGS. 7, 8 and 9.

Figure 7:
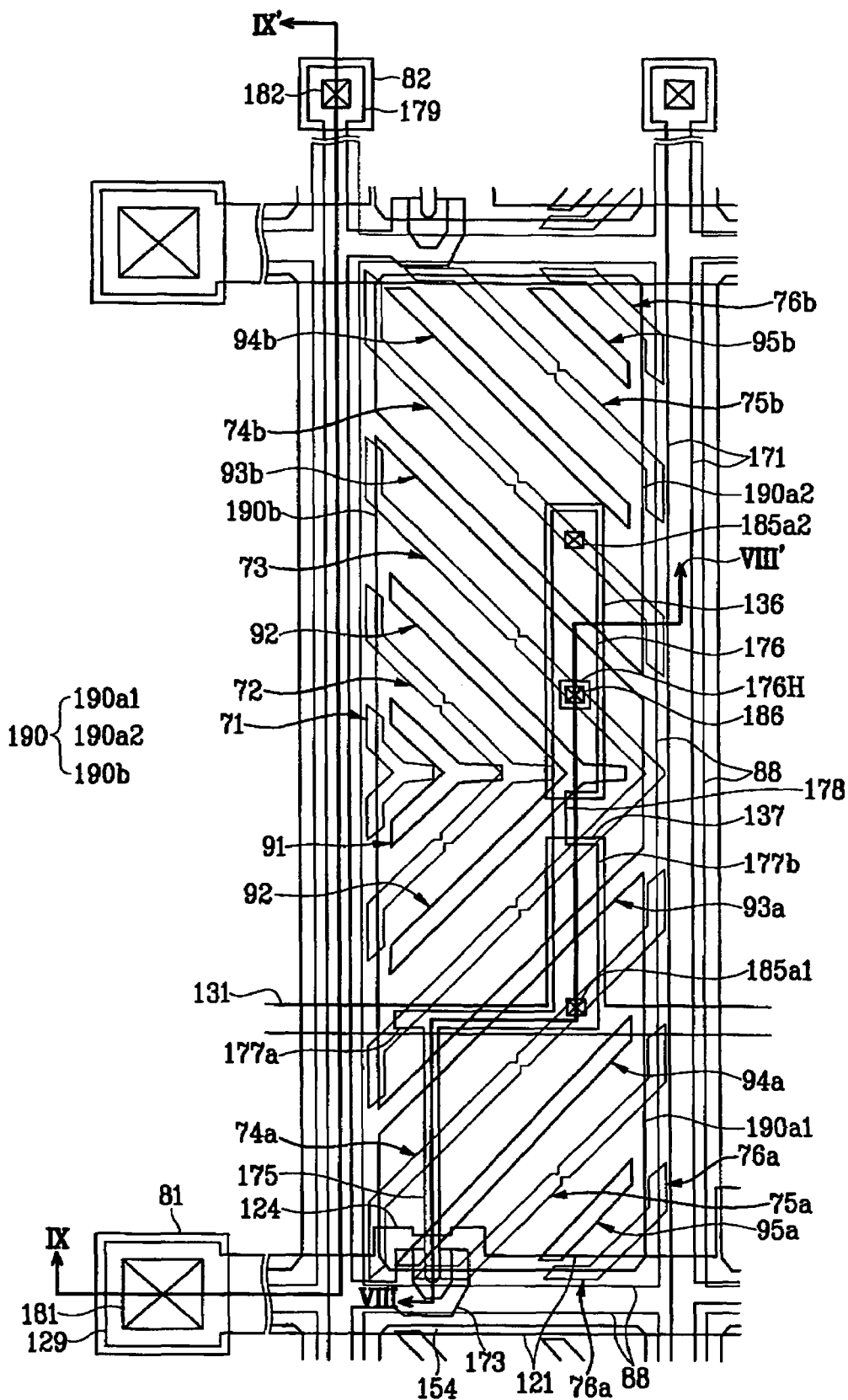
FIG. 7 is a layout view of an LCD according to another embodiment of the present invention.
Figure 8:
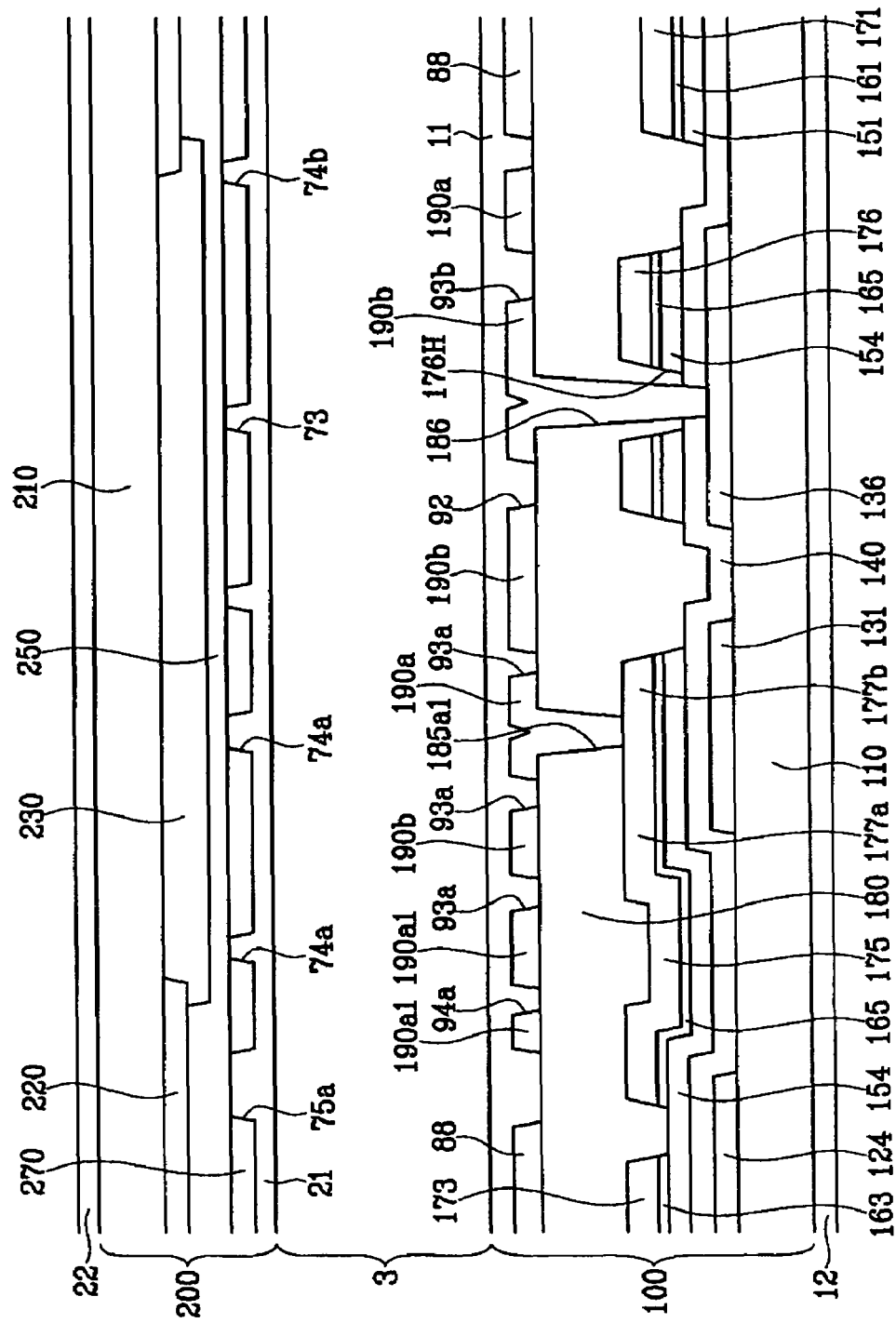
FIGS. 8 and 9 are sectional views of the LCD shown in FIG. 7 taken along lines VIII-VIII' and IX-IX'.
Figure 9:
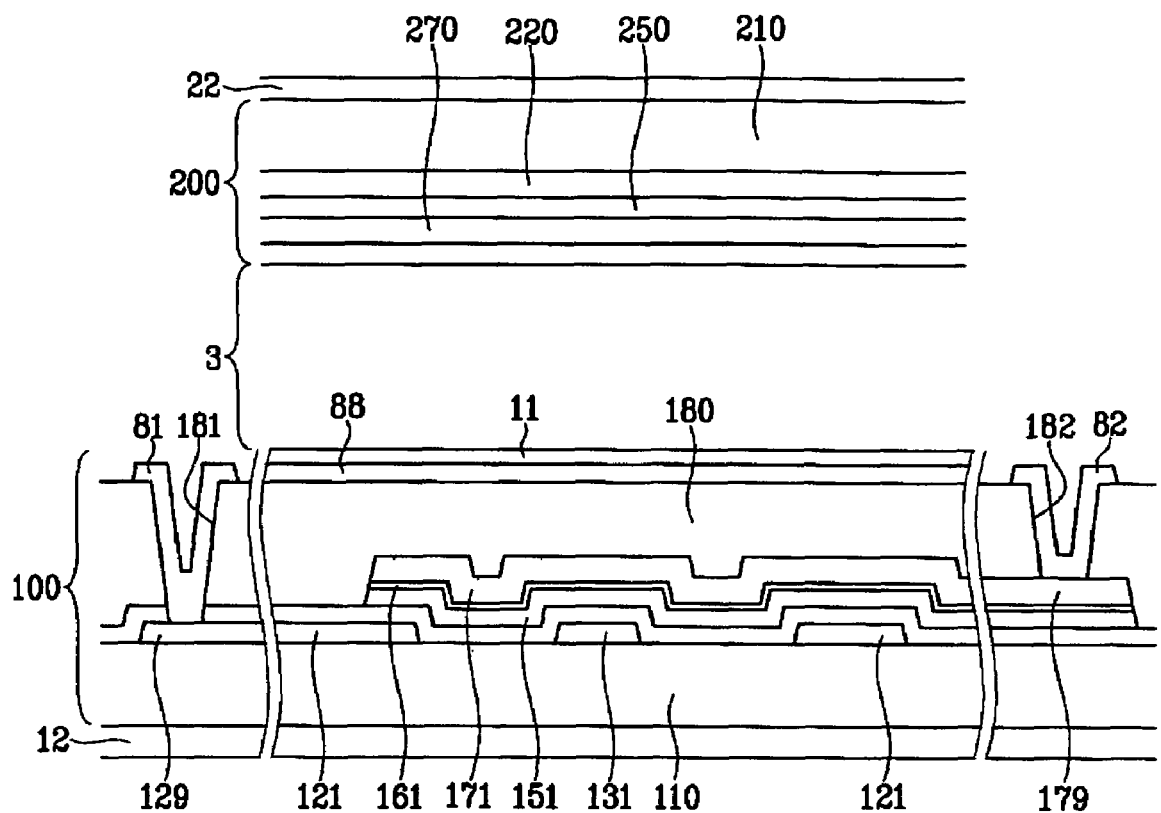

FIG. 7 is a layout view of an LCD according to another embodiment of the present invention, and FIGS. 8 and 9 are sectional views of the LCD shown in FIG. 7 taken along lines VIII-VIII' and IX-IX'.

Referring to FIGS. 7-9, an LCD according to this embodiment also includes a TFT array panel 100, a common electrode panel 200, a LC layer 3 interposed between the panels 100 and 200, and a pair of polarizers 12 and 22 attached on outer surfaces of the panels 100 and 200.

Layered structures of the panels 100 and 200 according to this embodiment are almost the same as those shown in FIGS. 1-5.

Regarding the TFT array panel 100, a plurality of gate lines 121 including gate electrodes 124 and end portions 129, a plurality of storage electrode lines 131 including storage electrodes 137, and a plurality of capacitive electrodes 136 are formed on a substrate 110. A gate insulating layer 140, a plurality of semiconductors 154, and a plurality of ohmic contacts 163 and 165 are sequentially formed on the gate lines 121 and the storage electrodes lines 131. A plurality of data lines 171 including source electrodes 173 and end portions 179 and a plurality of drain electrodes 175 including extensions 176, 177a and 177b and interconnections 178 are formed on the ohmic contacts 163 and 165. A passivation layer 180 is formed on the data lines 171, the drain electrodes 175, and exposed portions of the semiconductors 154. A plurality of contact holes 181, 182, 185a1, 185a2 and 186 are provided at the passivation layer 180 and the gate insulating layer 140 and the contact holes 186 pass through through-holes 176H provided at the extensions 176 of the drain electrodes 175. A plurality of pixel electrodes 190 including sub-pixel electrodes 190a1, 190a2 and 190b and having cutouts 91-95b, a shielding electrode 88, and a plurality of contact assistants 81 and 82 are formed on the passivation layer 180, and an alignment layer 11 is coated thereon.

Regarding the common electrode panel 200, a light blocking member 220, a plurality of color filters 230, an overcoat 250, a common electrode 270 having cutouts 71-76b, and an alignment layer 21 are formed on an insulating substrate 210.

Different from the LCD shown in FIGS. 1-5, the semiconductors 154 and the ohmic contacts 163 of the TFT array panel 100 according to this embodiment extend along the data lines 171 to form semiconductor stripes 151 and ohmic contact stripes 161. In addition, the semiconductor stripes 154 have almost the same planar shapes as the data lines 171 and the drain electrodes 175 as well as the underlying ohmic contacts 163 and 165. However, the semiconductors 154 include some exposed portions, which are not covered with the data lines 171 and the drain electrodes 175, such as portions located between the source electrodes 173 and the drain electrodes 175.

A manufacturing method of the TFT array panel according to an embodiment simultaneously forms the data lines 171 and the drain electrodes 175, the semiconductors 151, and the ohmic contacts 161 and 165 using one photolithography step.

A photoresist masking pattern for the photolithography process has position-dependent thickness, and in particular, it has thicker portions and thinner portions. The thicker portions are located on wire areas that will be occupied by the data lines 171 and the drain electrodes 175 and the thinner portions are located on channel areas of TFTs.

The position-dependent thickness of the photoresist is obtained by several techniques, for example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask only with transparent areas and opaque areas, it is subject to reflow process to flow onto areas without the photoresist, thereby forming thin portions.

As a result, the manufacturing process is simplified by omitting a photolithography step.

Many of the above-described features of the LCD shown in FIGS. 1-5 may be appropriate to the LCD shown in FIGS. 7-9.

An LCD according to another embodiment of the present invention will be described in detail with reference to FIG. 10.

Figure 10:
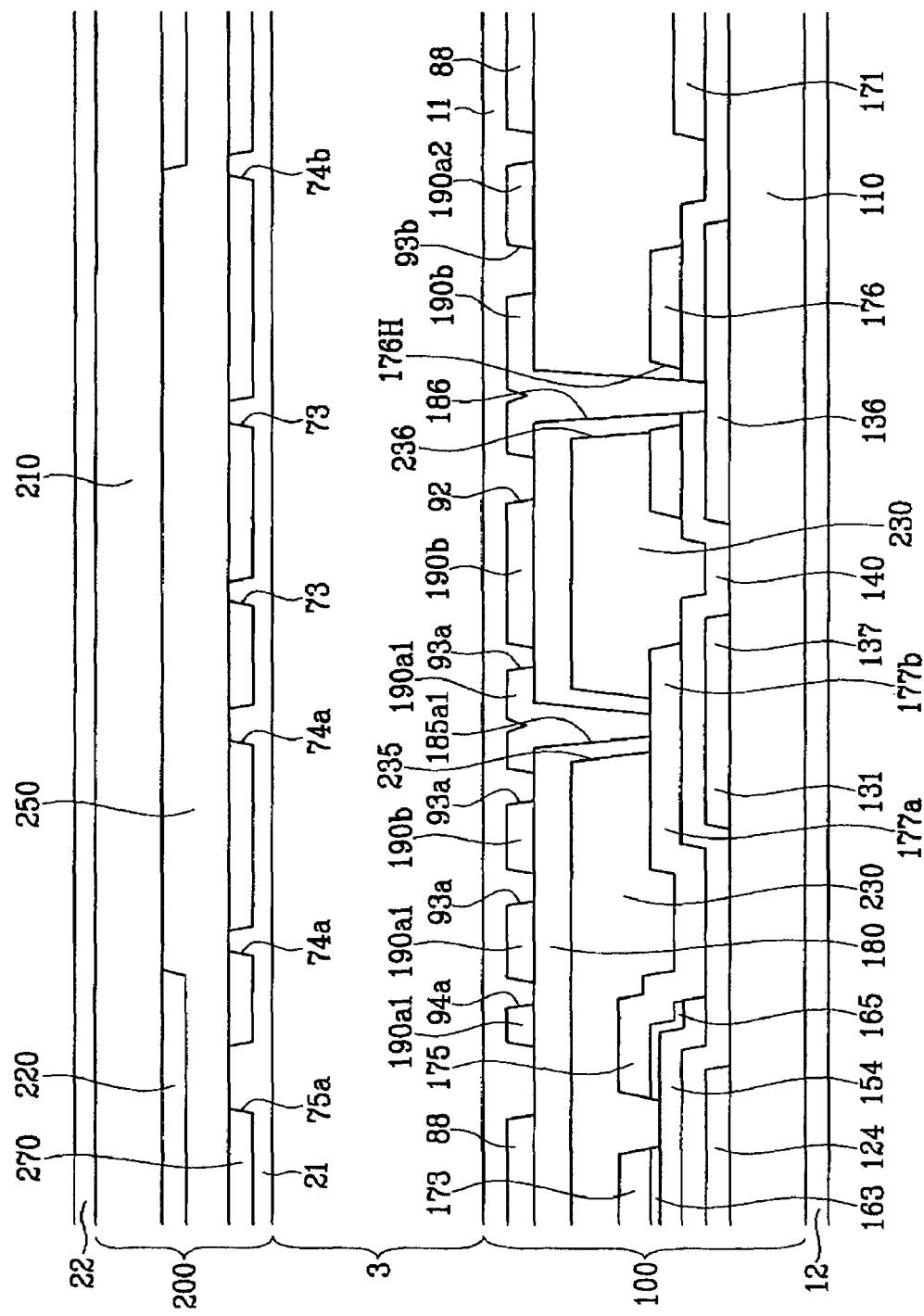
FIG. 10 is a sectional view of the LCD shown in FIG. 3 taken along line IV-IV according to another embodiment of the present invention.

FIG. 10 is a sectional view of the LCD shown in FIG. 3 taken along line IV-IV'.

Referring to FIG. 10, an LCD according to this embodiment also includes a TFT array panel 100, a common electrode panel 200, a LC layer 3 interposed between the panels 100 and 200, and a pair of polarizers 12 and 22 attached on outer surfaces of the panels 100 and 200.

Layered structures of the panels 100 and 200 according to this embodiment are almost the same as those shown in FIGS. 1-5.

Regarding the TFT array panel 100, a plurality of gate lines 121 including gate electrodes 124 and end portions 129, a plurality of storage electrode lines 131 including storage electrodes 137, and a plurality of capacitive electrodes 136 are formed on a substrate 110. A gate insulating layer 140, a plurality of semiconductors 154, and a plurality of ohmic contacts 163 and 165 are sequentially formed on the gate lines 121 and the storage electrodes lines 131. A plurality of data lines 171 including source electrodes 173 and end portions 179 and a plurality of drain electrodes 175 including extensions 176, 177a and 177b and interconnections 178 are formed on the ohmic contacts 163 and 165 and the gate insulating layer 140. A passivation layer 180 is formed on the data lines 171, the drain electrodes 175, and exposed portions of the semiconductors 154. A plurality of contact holes 181, 182, 185a1, 185a2 and 186 are provided at the passivation layer 180 and the gate insulating layer 140 and the contact holes 186 pass through through-holes 176H provided at the extensions 176 of the drain electrodes 175. A plurality of pixel electrodes 190 including subpixel electrodes 190a1, 190a2 and 190b and having cutouts 91-95b, a shielding electrode 88, and a plurality of contact assistants 81 and 82 are formed on the passivation layer 180, and an alignment layer 11 is coated thereon.

Regarding the common electrode panel 200, a light blocking member 220, an overcoat 250, a common electrode 270 having cutouts 71-76b, and an alignment layer 21 are formed on an insulating substrate 210.

Different from the LCD shown in FIGS. 1-5, the TFT array panel 100 includes a plurality of color filters 230 disposed under the passivation layer 180, while the common electrode panel 200 has no color filter. In this case, the overcoat 250 may be removed from the common electrode panel 200.

The color filters 230 are disposed between two adjacent data lines 171 and they have a plurality of through-holes 235 and 236 through which the contact holes 185 and 186 pass through, respectively. The color filters 230 are not provided on peripheral areas provided with the end portions 129 and 179 of the signal lines 121 and 171.

The color filters 230 may extend along a longitudinal direction to form stripes and the edges of adjacent two of the color filters 230 may exactly match with each other on the data lines 171. However, the color filters 230 may overlap each other to block the light leakage between the pixel electrodes 190, or may be spaced apart from each other. When the color filters 230 overlap each other, linear portions of the light blocking member 220 may be omitted and in this case, the shielding electrode 88 may cover edges of the color filters 230. Overlapping portions of the color filters 230 may have a reduced thickness to decrease the height difference.

The color filters 230 may be disposed on the passivation layer 180, or the passivation layer 180 may be omitted.

Many of the above-described features of the LCD shown in FIGS. 1-5 may be appropriate to the LCD shown in FIG. 10.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor array panel comprising:
   a substrate;
   a gate line disposed on the substrate and extending in a first direction;
   a capacitive electrode separated from the gate line and elongated in a second direction;
   a data line intersecting the gate line;
   a thin film transistor connected to the gate line and the data line and including a drain electrode;
   a coupling electrode overlapping the capacitive electrode and connected to the drain electrode; and
   a pixel electrode including first and second subpixel electrodes connected to the drain electrode and a third subpixel electrode interposed between the first and second subpixel electrodes, the third subpixel electrode connected to the capacitive electrode and spaced apart from the first subpixel electrode by a first gap that overlaps the capacitive electrode and the coupling electrode.

2. The thin film transistor array panel of claim 1, further comprising a storage electrode line overlapping the pixel electrode and including a storage electrode.

3. The thin film transistor array panel of claim 2, wherein the drain electrode comprises an extension overlapping the first gap and the storage electrode.

4. The thin film transistor array panel of claim 3, wherein the storage electrode and the capacitive electrode extend in a line.

5. The thin film transistor array panel of claim 4, wherein the storage electrode, the capacitive electrode, the coupling electrode, and the extension of the drain electrode are elongated parallel to the data line and disposed substantially symmetrical to a reference line parallel to the gate line.

6. The thin film transistor array panel of claim 3, wherein the drain electrode further comprises an interconnection connecting the extension and the coupling electrode and disposed at a position far from the data line.

7. The thin film transistor array panel of claim 2, wherein the storage electrode line overlaps a second gap that separates the second and third subpixel electrodes.

8. The thin film transistor array panel of claim 2, wherein the third subpixel electrode is spaced apart from the second subpixel electrode by a second gap that overlaps the storage electrode.

9. The thin film transistor array panel of claim 1, further comprising a passivation layer disposed between the pixel electrode and the capacitive electrode and the coupling electrode.

10. The thin film transistor array panel of claim 9, wherein the coupling electrode has a through-hole and the passivation layer has a contact hole connecting the third subpixel electrode and the capacitive electrode and disposed within the through-hole of the coupling electrode.

11. The thin film transistor array panel of claim 1, wherein the first subpixel electrode is connected to the drain electrode via the coupling electrode.

12. The thin film transistor array panel of claim 1, further comprising a shielding electrode separated from the pixel electrode and overlapping the data line or the gate line at least in part.

13. The thin film transistor array panel of claim 12, wherein the pixel electrode and the shielding electrode comprise the same layer.

14. The thin film transistor array panel of claim 13, wherein the shielding electrode extends along the data line or the gate lines.

15. The thin film transistor array panel of claim 13, wherein the shielding electrode fully covers the data line.

16. The thin film transistor array panel of claim 1, wherein the pixel electrode comprises a partitioning member for partitioning the pixel electrode into a plurality of partitions.

17. The thin film transistor array panel of claim 16, wherein the partitioning member comprises a portion extending parallel to the first gap.

18. The thin film transistor array panel of claim 17, wherein the first gap makes an angle of about 45 degrees with the gate line.

19. A liquid crystal display comprising:
   a gate line;
   a data line intersecting the gate line;
   a capacitive electrode separated from the gate line and elongated substantially parallel to the data line;
   a thin film transistor connected to the gate line and the data line and including a drain electrode;
   a coupling electrode overlapping the capacitive electrode and connected to the drain electrode;
   a pixel electrode including first and second subpixel electrodes connected to the drain electrode and a third subpixel electrode interposed between the first and second subpixel electrodes, the third subpixel electrode connected to the capacitive electrode and spaced apart from the first subpixel electrode by a gap that overlaps at least one of the capacitive electrode and the coupling electrode;

a common electrode disposed opposite the pixel electrode;

and a liquid crystal layer interposed between the pixel electrode and the common electrode.

20. The liquid crystal display of claim 19, wherein the liquid crystal layer is subjected to a vertical alignment.

21. A method of manufacturing thin film transistor array panel, the method comprising:

forming a gate line and a capacitive electrode on a substrate, the gate line and the capacitive electrode separated from each other and extending in different directions;

forming a data line including a source electrode, a drain electrode separated from the data line, and a coupling electrode overlapping the capacitive electrode and connected to the drain electrode; and forming a pixel electrode including first and second subpixel electrodes connected to the drain electrode and a third subpixel electrode connected to the capacitive electrode and interposed between the first and second subpixel electrodes, wherein the third subpixel electrode is spaced apart from the first subpixel electrode by a gap that overlaps at least one of the capacitive electrode and the coupling electrode.

* * * * *